United States Patent [19]

Speit

[11] Patent Number: 5,895,768
[45] Date of Patent: Apr. 20, 1999

[54] CHEMICALLY PRESTRESSABLE ALUMINOSILICATE GLASS AND PRODUCTS MADE THEREFROM

[75] Inventor: Burkhard Speit, Mainz, Germany

[73] Assignee: Schott Glaswerke, Mainz, Germany

[21] Appl. No.: 08/837,867

[22] Filed: Apr. 25, 1997

[30] Foreign Application Priority Data

Apr. 26, 1996 [DE] Germany ............... 196 16 633

[51] Int. Cl.⁶ .................. C03C 3/095; C03C 3/112
[52] U.S. Cl. .................. 501/57; 501/64; 501/69; 428/694 ST
[58] Field of Search ................ 501/57, 64, 69; 428/694 ST

[56] References Cited

U.S. PATENT DOCUMENTS

| | | |
|---|---|---|
| 4,687,751 | 8/1987 | Barlier et al. ............... 501/57 |
| 5,213,440 | 5/1993 | Yeh et al. ............... 501/64 |
| 5,459,110 | 10/1995 | Brix ............... 501/67 |
| 5,656,558 | 8/1997 | Brix et al. ............... 501/64 |

FOREIGN PATENT DOCUMENTS

4206268A1  11/1992  Germany.

*Primary Examiner*—Karl Group
*Attorney, Agent, or Firm*—Michael J. Striker

[57] ABSTRACT

The chemically prestressable glass having a low bubble count and bubble size has the following composition in mol %, based on a total amount of oxides present, $SiO_2$ from 63.0 to 67.5 mol %, $Al_2O_3$ from 9.5 to 12.0 mol %, $Na_2O$ from 8.5 to 15.5 mol %, $K_2O$ from 2.5 to 4.0 mol %, MgO from 3.0 to 9.0 mol %, sum of CaO+SrO+BaO+ZnO from 0 to 2.5 mol %, $TiO_2$ from 0.5 to 1.5 mol %, $CeO_2$ from 0.02 to 0.5 mol %, $As_2O_3$ from 0.02 to 0.35 mol %, $SnO_2$ from 0. to 1.0 mol %, and $F_2$ from 0.05 to 2.6 mol %, wherein the molar ratio $|SiO_2|/|Al_2O_3|$ is 5.3 to 6.85, the molar ratio $|Na_2O|/|K_2O|$ is 3.0 to 5.6, the molar ratio $|Al_2O_3|/|K_2O|$ is 2.8 to 3.6 and the molar ratio $|Al_2O_3|/|TiO_2+CeO_2|$ is 7.6 to 18.5, but, when arsenic-free, $SnO_2$ is from 0.02 to 1.0 mol % and $F_2$ is from greater than 0.5 to 2.6 mol %. The invention also includes a safety glass and a hard disk for information storage made from this chemically prestressable glass.

8 Claims, No Drawings

CHEMICALLY PRESTRESSABLE ALUMINOSILICATE GLASS AND PRODUCTS MADE THEREFROM

CROSS-RELATED

Reference is made to the co-pending U.S. Patent Application entitled "Process for Production of a Chemically Prestressed Glass and Said Glass", whose inventor is the same as the instant invention.

BACKGROUND OF THE INVENTION

The invention relates to chemically prestressable aluminosilicate glasses having a low bubble count and bubble size. Such glasses are particularly suitable for use as substrate glasses for information recording and as safety glass sheets or moldings. After processing and prestressing, they must be able to withstand increased chemical, mechanical and thermal loads.

Thus, substrate glasses are subjected to high temperatures with short cooling times during further finishing, for example during coating in the manufacture of magnetic and optical hard disks as data storage media. When such hard disks are used, high mechanical loads occur, for example rotational speeds of 3500 to 10000 rpm and clamping stresses on the axis of rotation of up to 300 N/mm$^2$.

Safety glass sheets are clamped in frames and doors at a pressure of at least 50 N/mm$^2$. When destroyed mechanically, they must break into fine pieces in accordance with DIN 1249, Part 12.

Lamp covers and bulbs are subjected to large temperature gradients ($\Delta T>200°$ C.) between the glass and the frame or holder and hot spots on the surface.

In particular, thin glasses having a thickness of from 0.25 to 3.0 mm can only withstand such loads if they have been prestressed. Since increasing the mechanical strength by thermal prestressing is only possible from a minimum thickness of 3 mm, chemical prestressing by ion exchange in a salt bath is the method of choice here.

In chemical prestressing at below the glass transition temperature $T_g$, alkali metal ions having a small ionic diameter from the glass are replaced by alkali metal ions of larger diameter from the salt bath, for example Li$^{30}$ by Na$^+$, and Na$^{30}$ by K$^+$.

Thus, with compressive stress zones having a thickness of from about 14 to 230 µm, which corresponds to about ⅔ of the ion exchange depth, flexural strengths of 350 to 900 N/mm$^2$ can be built up.

Another important factor for the above-mentioned uses is the quality of the glass with respect to the number and size of flaws, such as solid inclusions and bubbles.

Aluminosilicate glasses are known to be difficult to refine and therefore are not of high quality with respect to the lowest possible number and smallest possible size of bubbles. The glass production process produces two classes of bubble, which differ in size and have size distribution function that do not overlap. The maximum bubble diameters in the two classes are at 50 and 500 µm for conventional and conventionally refined aluminosilicate glasses.

In safety glazing, all bubbles which are perceptible to the naked eye, i.e. bubbles having a diameter ($\phi$) of $\geq 80$ µm, are disturbing. For this reason, quality control only accepts glass sheets which contain at most one such bubble per liter of glass volume. By contrast, bubbles which are significantly smaller, i.e. < about 50 µm, are not disturbing for this application. This does not apply to use as highly polished substrates for coating products, for example for hard disk substrates. Here no large bubbles may be present, and even smaller bubbles or solid inclusions having a diameter up to from 2 to 15 µm are unacceptable in relatively large numbers, because, if they are at the substrate surface and are polished, they cause a hole corresponding to their diameter, which results in a loss of surfaces flatness, which makes them unsuitable for the desired application. Given the thinness of substrate glasses, the probability that a bubble present is precisely at one of the two surfaces is relatively high, as can easily be derived: for a uniform diameter D or bubbles or solid inclusions and a density N of the bubbles and inclusions, the probability W that a flaw caused by a bubble or a solid inclusion is in one of the two substrate surfaces having a size F is given by $$W = 2 \times D \times F \times N.$$

For example, for N=2500 bubbles and solid inclusions per liter of glass volume,

D=10 µm,

F=30 cm$^2$, of probability W of 0.15 is obtained. An excessively large number of bubbles of the above-mentioned small size thus also significantly reduces the production yield, by a factor of 0.85 in the example calculated above, which means that flawed substrate occurs in approximately every seventh substrate.

The poor refinability of aluminosilicate glasses can be countered with certain limits by an Li$_2$O content in the glass besides Na$_2$O. This reduces the viscosity of the glass during homogenization, which promotes degassing. Such a glass is described in DE 42 06 268 A1.

However, the presence of Li ions makes it more difficult to achieve high compressive stresses in chemical prestressing due to ion exchange, since two types of ion are exchanged, namely Li$^+$ by Na$^+$ and Na$^+$ by K$^{30}$, and since a specific mixing ratio between Na and K salts and narrow temperature limits must generally be observed during the exchange process. This can result in a stress being built up only poorly, or not at all, or in the glass having no resistance to stress relaxation.

The driving force for stress relaxation in chemically prestressed glass is the concentration gradient. Together with oxygen ions, the fluoride component in the glass forms the anion network of the glass, in which large ions can easily diffuse. This favors stress reduction. Glasses having relatively high fluoride contents are thus unsuitable for chemical prestressing.

SUMMARY OF THE INVENTION

It is an object of the present invention to provide an aluminosilicate glass which is chemically prestressable and, after prestressing, has high flexural strength and low stress relaxation and at the same time has high quality with respect to the number and size of bubbles.

According to the invention, the chemically prestressable glass having a low bubble count and bubble size has the following the composition (in mol %, based on oxides):

| | |
|---|---|
| SiO$_2$ | from 63.0 to 67.5 mol %, |
| Al$_2$O$_3$ | from 9.5 to 12.0 mol %, |
| Na$_2$O | from 8.5 to 15.5 mol %, |
| K$_2$O | from 2.5 to 4.0 mol %, |
| MgO | from 3.0 to 9.0 mol %, |

-continued

| | |
|---|---|
| ΣCaO+SrO+BaO+ZnO | from 0 to 2.5 mol %, |
| $TiO_2$ | from 0.5 to 1.5 mol %, |
| $CeO_2$ | from 0.02 to 0.5 mol %, |
| $As_2O_3$ | from 0.02 to 0.35 mol %, |
| $SnO_2$ | from 0 to 1.0 mol %, and |
| $F_2$ | from 0.05 to 2.6 mol %, | wherein the molar ratio of the $SiO_2$ to the $Al_2O_3$ is between 5.3 and 6.85, the molar ratio of the $Na_2O$ to the $K_2O$ is between 3.0 and 5.6, the molar ratio of the $Al_2O_3$ to $K_2O$ is between 2.8 and 3.6 and the molar ratio of the $Al_2O_3$ to a total amount of the $TiO_2$ and the $CeO_2$ is between 7.6 and 18.5.

The above object is attained particularly in an embodiment in which the glass has the above compositions and the total amount of the CaO, SrO, BaO and ZnO in the glass if from 0.1 to 2.5 mol %.

In the aluminosilicate glasses used in accordance with the invention, the $SiO_2$ content must not exceed 67.5 mol %, since otherwise the melting points increase excessively. On the other hand, $SiO_2$ content must not drop below 63.0 mol %, since otherwise the chemical resistance is impaired excessively. For the same reasons, the $Al_2O_3$ content must not exceed 12.0 mol % or drop below 9.5 mol %.

In order to ensure both good acid resistance and good ion exchangeability $SiO_2$ and $Al_2O_3$ must be present in a balanced ratio to one another. Thus, the $SiO_2/Al_2O_3$ molar ratio should be between 5.3 and 6.85.

An essential constituent of the glasses are the alkali metal oxides. Because of the invention's effective combination of refining agents described below, $Li_2O$ can be omitted completely, which makes it possible to achieve the properties formulated in the object with respect to bubble quality and chemical prestressing simultaneously in a single glass, the novel one.

The $Na_2O$ content should be between 8.5 and 15.5 mol %. If it is higher than 15.5 mol %, the chemical resistance is impaired, and if it is lower than 8.5 mol %, firstly the glass becomes more difficult to melt and secondly the increase in strength by $Na^+/K^+$ ion exchange only becomes possible to a restricted extent.

A constituent having a particular and surprising action is $K_2O$ which should be present in an amount of from 2.5 to 4.0 mol %. It further increases the meltability of the glass and accelerates an ion exchange process of $Na^+$ ion in the glass by the K ion in the salt bath. In addition, homogenization is simplified, which means an improvement with respect to the desired freedom from bubbles. This is because $K_2O$ increases the basicity of the glass more than the same number of moles of $Na_2O$, thus simplifying refining without impairing the high chemical resistance or chemical prestressability. The simplified production of glass of high bubble quality with the same chemical and mechanical properties is only ensured in the stated percentage range. In addition, the $Al_2O_3/K_2O$ ratio is also important. The more $Al_2O_3$ is present, the more $K_2O$ is required. Thus, the $Al_2O_3/K_2O$ molar ratio should be between 2.8 and 3.6. If the $K_2O$ content is lower than 2.5 mol % and if the $Al_2O_3/K_2O$ ratio is less than 2.8, the bubble density and bubble size increase; if the $K_2O$ content is greater than 4.0 mol % and the $Al_2O_3/K_2O$ ratio is greater than 3.6, the strength of the glasses cannot be increased sufficiently during prestressing.

The two alkali metal oxides must also be present in a balanced ratio to one another. Thus, the $Na_2O/K_2O$ molar ratio should be between 3.0 and 5.6.

A further necessary constituent is MgO, which should be present in a minimum amount of 3.0 mol %. This increases the basicity of the glasses and thus promotes homogenization. However, it also inhibits the ion exchange process, since the $Na^+$ ions are bound more strongly in aluminosilicate glasses in the presence of divalent ions. For this reason, a maximum content of 9.0 mol % of MgO should not be exceeded. The other alkaline earth metal oxides and ZnO also have the same effects. The glass can therefore also contain CaO, SrO, BaO and ZnO in a total amount of 0 to 2.5 mol % Σ CaO+SrO+BaO+ZnO, preferably from 0.1 to 2.5 mol % Σ CaO+SrO+BaO+ZnO. The preference for MgO over the other alkaline earth metal oxides and ZnO is due to the fact that MgO improves the meltability in a similar way to BaO and CaO, but reduces the chemical resistance much less than these oxides.

$TiO_2$ is a further necessary component of the glass. It should be present in an amount of at least 0.5 mol %, but a content of 1.5 mol % should not be exceeded, since otherwise difficulties occur during melting of the batch. The other components, refining agents and refining aids must also be present in a balanced combination in order to achieve the best results regarding bubble count and size. The presence of $CeO_2$ is essential. It should be present in the glass in an amount of between 0.02 and 0.5 mol %. It not only has a refining function, but also additionally provides the glass with sufficiently high absorption of UV radiation, which is medically questionable, thus also enabling use of the glass in the lighting industry. It has been found that the requisite amount of refining agents depends on the amount of $Al_2O_3$ present. The more $Al_2O_3$ that is present in the glass, the more refining agents are necessary. In particular, an $Al_2O_3/(CeO_2+TiO_2)$ ratio of between 7.6 and 18.5 should be observed.

$As_2O_3$ should be present in an amount of from 0.02 to 0.35 mol %. $SnO_2$ may likewise be helpful for refining in an amount of up to 1.0 mol %.

The glass must furthermore contain $F_2$ in an amount between 0.05 and 2.6 mol %. The lower limit is set by the requirements for bubble quality, and the upper limit results from the effect of the fluoride in the glass network that has already been described above. The preferred range is from 0.05 to 0.7 mol %.

A glass of this composition can be processed, for example, by conventional drawing processes. Because of its high bubble quality and good prestressability, it is highly suitable for the production of prestressed substrate glass for data carriers and also prestressed safety glass.

If no $As_2O_3$ is added, the novel glass can also be processed on float glass equipment. Arsenic-free glass of this type as defined in the claims contains from 0.02 to 1.0 mol % of $SnO_2$ and from >0.5 to 2.6 mol % of $F_2$ in addition to the above-mentioned amounts of $CeO_2+TiO_2$ to achieve the high bubble quality desired. Compared with arsenic-containing compositions, a larger minimum amount of fluoride is thus necessary, and $SnO_2$ is an essential constituent. Although this glass does not achieve the extraordinarily good bubble qualities of arsenic-containing glasses, it does, however, also have very good bubble quality in particular with respect to the number of bubbles in the above-mentioned larger diameter class and is thus highly suitable for the production of a prestressed safety glass.

The composition of the novel glasses is such that a strong and durable prestressing can be built up therein in a simple manner by chemical prestressing. To this end, the glasses are left in conventional salt baths comprising from 100 to more than 90% by weight of potassium salts, for example potassium nitrate, for from 0.5 to 20 hours at bath temperatures of from 350 to 550° C. Any remainder of the salt bath can be components which lower the melting point of the salt bath. A treatment of this type produces comparative stress zones with a thickness of from about 14 μm to more than 230 μm and flexural strengths of from 350 to 900 N/mm², where lower temperatures make longer residence times necessary. All common potassium salts whose anions are stable in the stated temperature range can be used for the salt bath. The salt bath (in general starting with from 100% of potassium salt) is renewed when the potassium content has dropped, because of exchange, so far that the desired exchange depth is no longer achieved. This is generally the case at 90% by weight of potassium salts. It is also possible to start with up to <10% by weight of other salts which lower the melting point of the bath. This naturally means that the exchange capacity of the bath is exhausted correspondingly earlier.

The advantage of the novel glasses is that they combine the following properties: they are readily prestressable and have high flexural strengths after prestressing, and they have high quality with respect to a low bubble count and bubble size.

WORKING EXAMPLES

Table 1 shows examples of novel, chemically prestressed glasses. The table contains their composition, data on the ion exchange conditions in a KNO₃ bath, and relevant properties regarding both bubble quality and strength.

The glasses were produced from conventional raw materials in 4 l platinum crucibles. The raw materials were introduced over a period of 8 hours at melt temperatures of 1580° C. The glass was subsequently kept at this temperature for 14 hours, then cooled to 1400° C. over the course of 8 hours with stirring and poured into a graphite mold preheated to 500° C. The resultant cast block was converted into a cube with polished surfaces. Circular glass disks with the shape and dimensions of hard disk substrates, i.e. an external diameter of 65.0 mm and a thickness of 0.635 mm, with a central hole having a diameter of 20.0 mm were produced from this glass element in a conventional manner. The finely ground and polished glass disks were than chemically prestressed in a KNO₃ bath under the respective conditions shown in the table.

The novel glass can be produced on a production scale in platinum troughs or alternatively in melting tanks lined with ceramic, for example with AZS bricks aluminium-zirconium-silicon oxide ceramic).

As is known, the bubble count of glasses can vary as a function of the melt volume. It usually improves with increasing volume. Thus, the glass of Example 3 from Table 1 was also produced on a production scale with a melt volume of >1 m³ and had at most two small ($\phi$=1–20 μm) and two large ($\phi$=80–150 μm) bubbles per l of glass volume. The requirements regarding the other properties mentioned were also satisfied.

The properties mentioned are measured by the following methods:

The flexural strength is determined by a method which is conventional in the glass industry and is aimed at the loads occurring in practice: in the so-called double-ring test, the chemically prestressed glass disk having the shape and dimensions of a hard disk substrate is laid, centered, on a metal supporting ring having an annular cutter of hardened steel with a diameter of i.e. somewhat smaller than the disk to be tested ($\phi$=65 mm). A further metal supporting ring having a steel cutter is likewise laid, centered, on top of the glass disk. This cutter, with a diameter of 25 mm, is somewhat larger than the central hole ($\phi$=20 mm) of the hard disk substrate. This upper ring presses with its cutter at a rate of 2 mm/min on the glass disk lying on the cutter of the lower ring and thus exerts a constantly increasing force on the hard disk substrate. The load at which the substrate breaks is given as the flexural strength [N/mm²]. The test is regarded as passed if the breakage only occurs at a load of >100 N.

The compressive stress is measured by a stress-optical method: if the glass plate is subjected to compressive stress, the refractive indices parallel and perpendicular to the direction of the stress change, and the glass plate becomes birefringent. The birefringence, the difference between these refractive indices, is proportional to the applied stress via the stress-optical constant of the glass in question and is determined from the path difference between perpendicular and parallel polarized light after reflection at the glass surface.

The thickness of the comparative stress zone is measured as follows: a glass sample is observed under a polarizing microscope at a wavelength of 546 nm. The sample treated by ion exchange is under compressive stress over the entire surface and under tensile stress in its interior for equilibrium reasons. In order to measure the stress, the sample is introduced between two crossed polarizers. The stress exerted on the sample causes a brightening in the ray path of the microscope owing to stress birefringence. The transition from tensile stress to compressive stress (0-order neutral zone) is evident as a broad dark strip under the microscope. The distance of the 0 order from the edge of the sample is a measure of the thickness of the compressive stress zone.

The glass disks described above are too thin for this measurement, so glass slips measuring 6 mm×50 mm with a thickness of 2 mm produced and hardened under the same conditions as the glass disks are used.

The bubble size and count of the glasses is determined as follows:

Large bubbles, i.e. those which are visible with the naked eye ($\phi \geq 80$ μm), are also counted with the naked eye on a glass cube with an edge length of 10 cm. The size and number of small bubbles are measured on glass plates measuring 10 cm×10 cm×0.1 cm with good optical polishing by means of a microscope with a magnification of 400–500×.

The maximum piece size on shattering is determined in accordance with DIN 1249, Part 12, and the Knoop hardness in accordance with DIN 52333.

TABLE I

Composition (in mol %, based on oxides) of Prestressable Glasses Produced according to the invention, and their essential properties

|  | 1 | 2 | 3 | 4 | 5 | 6 | 7 |
|---|---|---|---|---|---|---|---|
| SiO₂ | 65.54 | 67.32 | 63.60 | 63.67 | 66.26 | 66.83 | 67.36 |
| Al₂O₃ | 9.60 | 11.18 | 11.91 | 9.74 | 10.91 | 10.91 | 11.28 |
| Na₂O | 8.66 | 13.58 | 12.49 | 16.02 | 11.30 | 11.30 | 12.82 |
| K₂O | 2.68 | 3.17 | 3.48 | 2.89 | 3.82 | 3.82 | 3.82 |
| MgO | 8.62 | 3.29 | 6.51 | 3.97 | 3.25 | 3.25 | 3.25 |
| CaO + SrO + BaO + ZnO | 1.25 | 0.24 | 0.47 | 0.14 | 0.12 | 0.12 | 0.24 |
| SnO₂ | 1.0 | — | — | 0.15 | — | — | 0.15 |
| TiO₂ | 1.19 | 0.54 | 0.66 | 0.64 | 1.23 | 0.66 | 0.54 |
| CeO₂ | 0.06 | 0.46 | 0.02 | 0.15 | 0.19 | 0.19 | 0.15 |
| F₂ | 1.41 | 0.09 | 0.51 | 2.53 | 2.59 | 2.59 | 0.22 |
| As₂O₃ | — | 0.17 | 0.35 | 0.05 | 0.33 | 0.33 | 0.17 |
| Ion exchange temperature, ° C. | 500 | 450 | 400 | 450 | 480 | 480 | 520 |
| Ion exchange time, h | 10 | 1.5 | 5 | 4 | 6 | 6 | 20 |

TABLE I-continued

Composition (in mol %, based on oxides) of Prestressable Glasses Produced according to the invention, and their essential properties

| | 1 | 2 | 3 | 4 | 5 | 6 | 7 |
|---|---|---|---|---|---|---|---|
| Compressive stress zone thickness, μm | 105 | 35 | 45 | 52 | 128 | 125 | 220 |
| Max. piece size mm | 7 | 3 | 4 | 7.5 | 6 | 5.5 | 2.2 |
| Flexural strength, N/mm$^2$ | 720 | 490 | 410 | 560 | 640 | 620 | 900 |
| Knoop hardness, KH | 585 | 590 | 600 | 545 | 562 | 568 | 609 |
| Modulus of elasticity E, kN/mm$^2$ | 70 | 71 | 72 | 66 | 68 | 68 | 72 |
| Coefficient of thermal expansion $\alpha_{20/300}$, $10^{-6}$/K | 8.2 | 8.9 | 9.1 | 9.6 | 9.1 | 9.1 | 8.9 |
| Glass transition temperature, Tg | 595 | 632 | 618 | 565 | 573 | 579 | 626 |
| Number of Bubbles with $\phi$ = 1–20 μm/l glass volume | 245 | 28 | 31 | 82 | 45 | 63 | 35 |
| Number of Bubbles with $\phi$ = 80–150 μm/l glass volume | 8 | 3 | 3 | 9 | 4 | 5 | 5 |

Table 2 illustrates starting from a base glass (Example 3 from Table 1), the effect of varying the refining aids and agents on the bubble count and size. The proportion of the remaining components not shown remains constant, with only the $SiO_2$ content also being varied, since the respective $SiO_2$ content is used to correct the different total amounts of varied refining agent contents.

L1 and L2 are $CeO_2$- free comparative examples. L10 is also a comparative example which illustrates the relatively high amount of fluorine necessary in $As_2O_3$-free glasses.

TABLE 2

Variation of Refining Agent and Refining Aid Concentration (mol %) and Bubble Count per l of Glass Volume for a Glass having the Composition of Example 3 from Table 1

| | L1 | L2 | L3 | L4 | L5 | L6 | L7 | L8 | L9 | L10 |
|---|---|---|---|---|---|---|---|---|---|---|
| $CeO_2$ | — | — | 0.04 | 0.04 | 0.04 | 0.08 | 0.11 | 0.11 | 0.12 | 0.11 |
| $F_2$ | — | 0.51 | 0.09 | 0.51 | 1.04 | 0.51 | 0.51 | 2.57 | 1.08 | 0.50 |
| $As_2O_3$ | 0.33 | 0.33 | 0.33 | 0.17 | 0.33 | 0.17 | 0.17 | — | — | — |
| $SnO_2$ | — | — | — | — | — | — | — | 0.22 | 0.22 | 0.04 |
| Bubbles $\phi$ = 1–20 μm | 210 | 195 | 87 | 55 | 130 | 25 | 30 | 540 | 320 | 705 |
| Bubbles $\phi$ = 80–150 μm | 39 | 15 | 5 | 4 | 18 | 0 | 2 | 1 | 11 | 28 |

It has already been explained that fluoride contents can promote relaxation of stresses in chemically prestressed glasses. The partial pressure of $O_2$ in the glass melt is also adversely affected by fluorine. It can be measured using an oxygen probe made from yttrium-doped $ZrO_2$ ceramic.

Surprisingly, it has been found that glasses having the novel composition have, in spite of the fluoride content, both a satisfactory $O_2$ partial pressure in the melt and an extremely small stress relaxation after prestressing which only becomes detectable at high temperatures and after long periods of time.

The following example is intended to illustrate the low stress relaxation which is essential to the invention: a glass plate having the composition of Example 7 from Table 1 with a thickness of 0.635 mm was treated in a $KNO_3$ bath at 520° C. for 20 hours. A compressive stress zone with a thickness of 220 μm and a compressive stress of 800 N/mm$^2$ formed. Table 3 shows the time at various temperatures before a reduction in the table thickness of the compressive stress zone is observed. The instrumentation can detect changes in thickness from 4 μm. The optical method used has already been described. Such a reduction in the thickness of the compressive stress zone is associated with relaxation of compressive stress and is easier to measure than the compressive stress relaxation itself.

TABLE 3

Storage Temperature and Time for a Measurable Reduction (4 μm) in the Thickness of the Compressive Stress Zone commences for a glass having the Composition of Example 7 from Table 1

| Temperature (° C.) | Time (h) |
|---|---|
| 300 | >1000 |
| 350 | 500 |
| 400 | 100 |
| 500 | 30 |

Extrapolation gives a time of more than 50,000 hours at a temperature of 200° C. before stress relaxation occurs. For significantly lower temperatures, for example <60° C., the compressive stress can be regarded as being maintained virtually indefinitely along with the strength properties.

The disclosures in German Patent Application 196 16 633.0-45 of Apr. 26, 1996 is incorporated here by reference. This German Patent Application, at least in part, describes the invention described hereinabove and claimed in the claims appended herein in below and provides the basis for a claim of priority for the instant invention under 35 U.S.C. 119. Also the subject matter of the application referred to above in the cross-reference section is incorporated here by reference, since it describes a method of making the prestressed aluminosilicate glass according to the invention.

While the invention has been illustrated and described as embodied in a chemically prestressable aluminosilicate glass and products made therefrom, it is not intended to be limited to the details shown, since various modifications and changes may be made without departing in any way from the spirit of the present invention.

Without further analysis, the foregoing will be so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

1. A chemically prestressable glass having a low bubble count and bubble size having the following composition in mol %, based on a total amount of oxides present:

| | |
|---|---|
| $SiO_2$ | from 63.0 to 67.5 mol %, |
| $Al_2O_3$ | from 9.5 to 12.0 mol %, |
| $Na_2O$ | from 8.5 to 15.5 mol %, |
| $K_2O$ | from 2.5 to 4.0 mol %, |
| MgO | from 3.0 to 9.0 mol %, |
| ΣCaO+SrO+BaO+ZnO | from 0 to 2.5 mol %, |
| $TiO_2$ | from 0.5 to 1.5 mol %, |
| $CeO_2$ | from 0.02 to 0.5 mol %, |
| $As_2O_3$ | from 0.02 to 0.35 mol %, |
| $SnO_2$ | from 0 to 1.0 mol %, and |
| $F_2$ | from 0.05 to 2.6 mol %, | wherein a molar ratio of the $SiO_2$ to the $Al_2O_3$ is between 5.3 and 6.85, a molar ratio of the $Na_2O$ to the $K_2O$ is between 3.0 and 5.6, a molar ratio of the $Al_2O_3$ to $K_2O$ is between 2.8 and 3.6 and a molar ratio of the $Al_2O_3$ to a total amount of the $TiO_2$ and the $CeO_2$ is between 7.6 and 18.5.

2. The chemically prestressable aluminosilicate glass as defined in claim 1, containing from 0.05 to 0.7 mol % of $F_2$.

3. The chemically prestressable aluminosilicate glass as defined in claim 1, containing from 0.1 to 2.5 mol % of a sum total amount of said CaO, and SrO, and BaO and said ZnO.

4. The chemically prestressable glass having a low bubble count and bubble size which can be produced on float glass equipment and having the following composition in mol %, based on a total amount of oxides present:

| | |
|---|---|
| $SiO_2$ | from 63.0 to 67.5 mol %, |
| $Al_2O_3$ | from 9.5 to 12.0 mol %, |
| $Na_2O$ | from 8.5 to 15.5 mol %, |
| $K_2O$ | from 2.5 to 4.0 mol %, |
| MgO | from 3.0 to 9.0 mol %, |
| ΣCaO+SrO+BaO+ZnO | from 0 to 2.5 mol %, |
| $TiO_2$ | from 0.5 to 1.5 mol %, |
| $CeO_2$ | from 0.02 to 0.5 mol %, |
| $SnO_2$ | from 0.02 to 1.0 mol %, and |
| $F_2$ | from greater than 0.5 to 2.6 mol %, | wherein a molar ratio of the $SiO_2$ to the $Al_2O_3$ is between 5.3 and 6.85, a molar ratio of the $Na_2O$ to the $K_2O$ is between 3.0 and 5.6, a molar ratio of the $Al_2O_3$ to $K_2O$ is between 2.8 and 3.6 and a molar ratio of the $Al_2O_3$ to a total amount of the $TiO_2$ and the $CeO_2$ is between 7.6 and 18.5.

5. The chemically prestressable aluminosilicate glass as defined in claim 4, containing from 0.1 to 2.5 mol % of a sum total amount of said CaO, and SrO, said BaO and said ZnO.

6. A hard disk for information storage made from the chemically prestressable aluminosilicate glass as defined in claim 1.

7. A prestressed safety glass made from the chemically prestressable aluminosilicate glass as defined in claim 1.

8. A prestressed safety glass made from the chemically prestressable aluminosilicate glass as defined in claim 4.

* * * * *